A. PAUL.
FAUCET.
APPLICATION FILED NOV. 13, 1912.
1,088,088.
Patented Feb. 24, 1914.
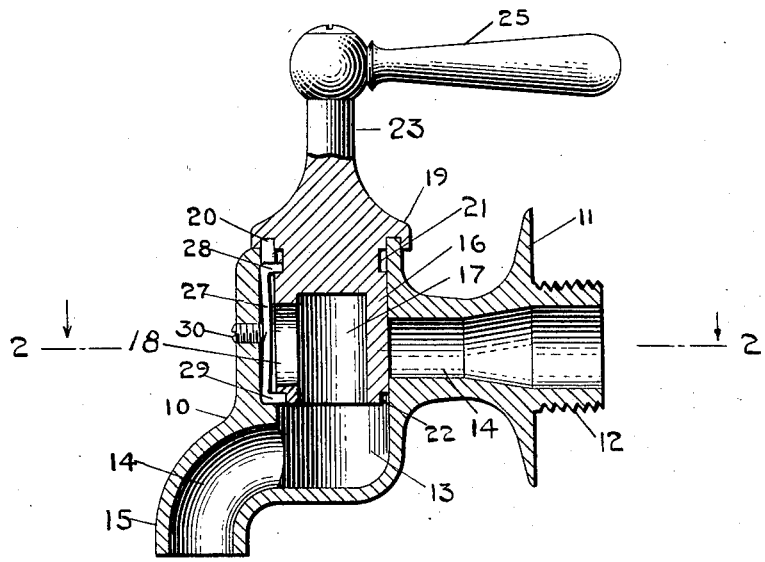
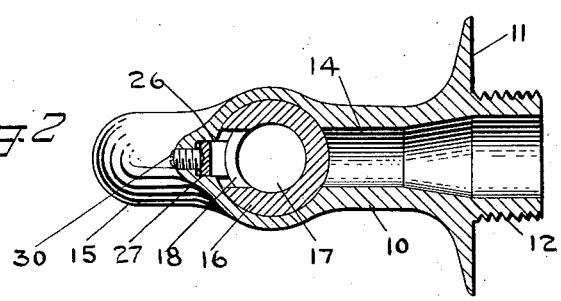
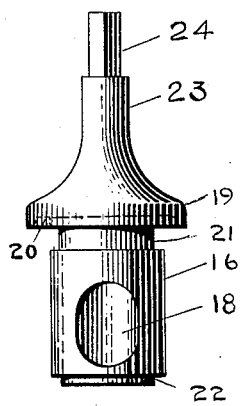
WITNESSES
Carl J. Larsen
Warren E. Willis
INVENTOR
Adolf Paul.

UNITED STATES PATENT OFFICE.

ADOLF PAUL, OF BROOKLYN, NEW YORK.

FAUCET.

1,088,088.  Specification of Letters Patent.  Patented Feb. 24, 1914.

Application filed November 13, 1912. Serial No. 731,107.

*To all whom it may concern:*

Be it known that I, ADOLF PAUL, a citizen of the United States, and a resident of Brooklyn, in the county of Kings and State of New York, have invented certain new and useful Improvements in Faucets, of which the following is a specification.

This invention relates to improvements in faucets and particularly to that class wherein the gate or plug portion is partially rotated with relation to the body or fixed portion. Its objects are, first, to provide faucets that require no rings, washers, disks or other forms of packing whatever, the parts being so arranged as to maintain, or even improve, their original non-leaking properties in use. Second, to provide means whereby such faucets have a uniform "feel", or tension in operation, and which are adjustable as to fluid pressure or power to be exerted. Third, to provide such faucets of a design that requires but a minimum of expense in construction, that combine strength with unusual lightness, and are of easy operation. These and other objects are attained by the novel construction and combination of parts hereinafter fully described and shown in the accompanying drawings, forming part of this specification, and in which:—

Figure 1 is a transverse vertical section of the faucet. Fig. 2 is a similar horizontal section taken on line 2—2 of Fig. 1, and, Fig. 3 is a side view of the plug or rotatable element.

The invention comprises a body 10 having a flanged base portion 11 adapted to be secured to a vertical wall as usual, and provided with a screw-threaded extension 12 for connection with the fluid supply pipe. The front portion of the body has a bored recess 13 extending from the top downwardly, intersecting the passage 14 which has an outlet through the down-turned spout 15.

Fitted to the bored recess 13 is the plug 16 having a chamber 17 centrally formed with an open bottom and a side opening 18 leading thereto, capable of being turned so as to register with the passage 14 in the faucet body; the plug is provided with an enlarged upper portion 19 in which is formed a concentric annular groove 20 adapted to fit over the body 10; there is further formed a circumferential groove 21 below the head portion and the end of the plug 22 is also reduced to the diameter of the last named groove; the plug stem 23 may be square as at 24 and fitted with an operating handle 25 as usual.

At the front of the faucet and with the bored recess 13 is formed a vertical slot 26 extending downward from the top adapted to receive a gib 27, preferably made of spring bronze, having inwardly turned ends 28 and 29 fitting the groove 21 and end 22 of the plug 16 in such manner as to secure it against longitudinal action within the bore of the faucet.

The extreme front of the faucet is enlarged or provided with a boss in which is an adjusting screw 30 having its point bearing against the back of the gib 27 and so arranged as to exert a tensional pressure therethrough to the faucet plug, keeping it always against the opening of the passage-way 14; thus it will be seen that a uniform tension can readily be obtained sufficient to overcome any fluid pressure against it and that the power to operate is practically uniform under all conditions; it will also be evident that the plug is self-fitting, the pressure of the spring gib tending to maintain a tight joint between the plug and passage-way opposite, unaffected by wear; hence no tight fitting of parts is required or the use of packings of any kind.

Having thus described my invention, what I claim as new and desire to secure by Letters Patent is:—

1. A faucet comprising a body having a passage-way therethrough and an intermediate bore of larger, uniform diameter, a plug fitted to revolve in said bore, said plug having an open chamber and a side passage therein, and a spring gib set in a recess formed in the bore of said body, adapted to contact with the plug at points above and below the faucet inlet and constituting means for preventing lineal action of said plug.

2. In a faucet, the combination with a body and plug revoluble therein, of a spring gib set in a slot formed in the bore of said body opposite to the inlet passage, projections extending inwardly from said gib at each end thereof, said projections being adapted to coöperatively engage annular grooves formed in said plug whereby it is prevented from longitudinal action and pressed against the inlet passage, and a tension adjusting means for said gib whereby the pressure is equalized over the bearing surface of the plug.

3. A faucet comprising a body having a passage-way and an enlarged bore open at the top, an annular projection at the top of the body, a plug revoluble in the bore, said plug having an annular recess to receive the top of the faucet body and formed with circumferential grooves at the top and bottom of its cylindrical portion, a gib set in a slotway formed in the bore of the body opposite to the inlet, said gib having inwardly turned portions adapted to engage with the grooves formed in the plug and a screw set in the body impinging upon said gib opposite to the passage inlet.

In testimony whereof I have signed my name to this specification in the presence of two subscribing witnesses.

ADOLF PAUL.

Witnesses:
GEORGE SCHAEFER,
WARREN E. WILLIS.

Copies of this patent may be obtained for five cents each, by addressing the "Commissioner of Patents, Washington, D. C."